B. H. ANIBAL.
VEHICLE GEARING.
APPLICATION FILED JULY 17, 1916.
1,259,065.
Patented Mar. 12, 1918.
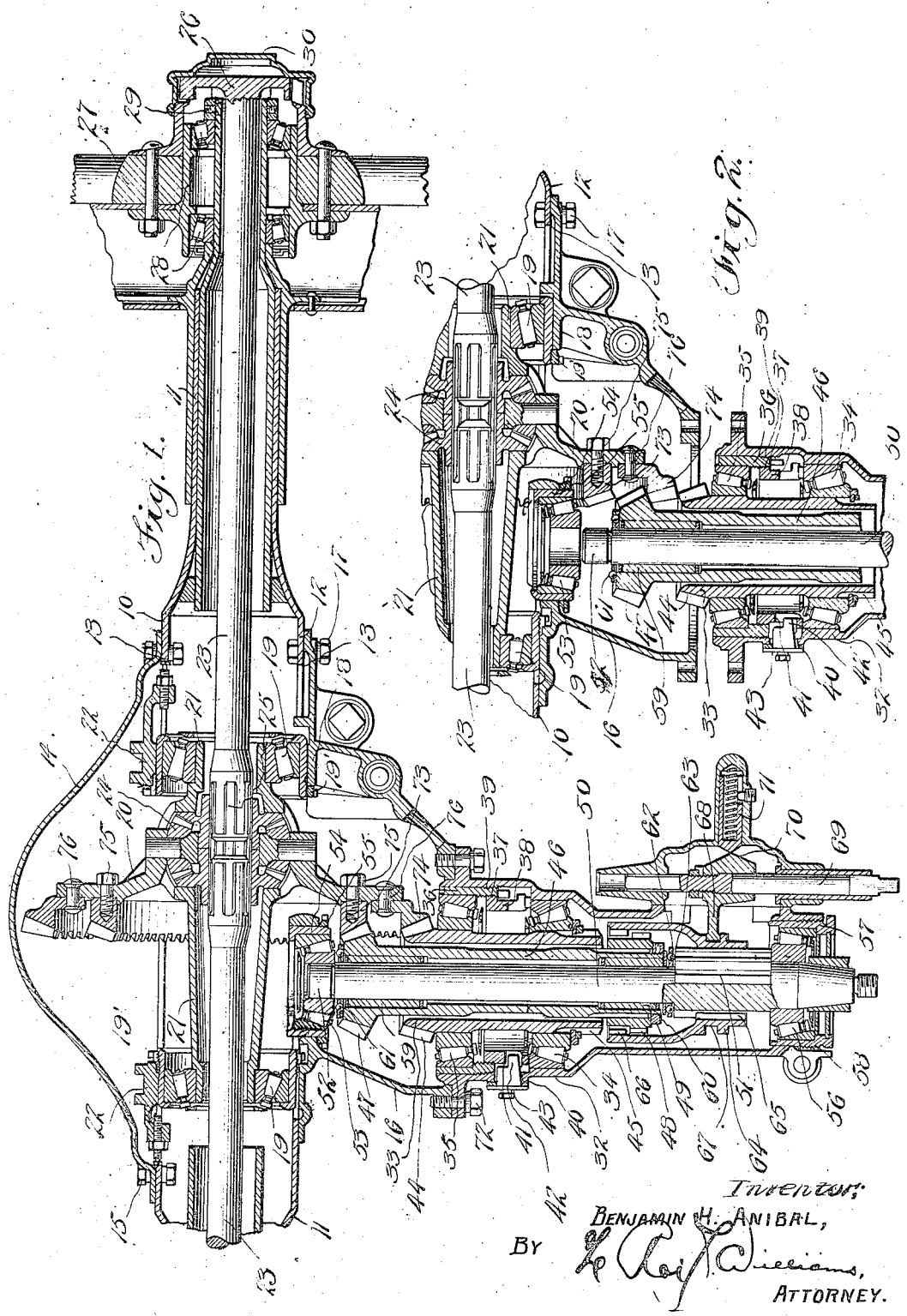
Inventor:
BENJAMIN H. ANIBAL,
BY
ATTORNEY.

UNITED STATES PATENT OFFICE.

BENJAMIN H. ANIBAL, OF DETROIT, MICHIGAN, ASSIGNOR TO CADILLAC MOTOR CAR COMPANY, OF DETROIT, MICHIGAN, A CORPORATION OF MICHIGAN.

VEHICLE-GEARING.

1,259,065.  Specification of Letters Patent.  Patented Mar. 12, 1918.

Application filed July 17, 1916. Serial No. 109,731.

*To all whom it may concern:*

Be it known that I, BENJAMIN H. ANIBAL, a citizen of the United States, and resident of Detroit, Wayne county, State of Michigan, have invented certain new and useful Improvements in Vehicle-Gearing, of which the following is a specification.

This invention relates to motor vehicles, and particularly to transmission or axle mechanisms, and speed change gearing especially adapted for use therein, although this invention is applicable, as will be seen hereinafter, for various other uses where similar results are desired.

One of the salient objects of this invention is to provide a simple, compact, and durable transmission mechanism adapted to provide a plurality of so-called direct drives of different ratios through single reductions between the driving shaft and the driven shaft.

Another object is to provide a transmission mechanism which is comparatively inexpensive to manufacture, and has provision for comparatively easy assembly and disassembly of the various parts.

Another object is to provide a multi-direct drive axle construction embodying at least a pair of nested bevel gear drives wherein the high direct drive is on the inside and the low direct drive outside, yet the arrangement and disposition of parts is such that the driving connections may be disengaged without disturbing either the mounting of the driven gears or at least one of the driving pinions.

These, and other salient objects, will clearly appear from the following description, taken in connection with the accompanying drawings which form a part of this specification, and in which:

Figure 1 is a longitudinal sectional view, with portions broken away, of a motor vehicle rear axle transmission system embodying a preferred form of this invention; and Fig. 2 is a similar view of the central portion of the axle, showing the relation of the driving pinions and driven gears when these parts are fully disengaged.

Referring to the drawings, it will be understood that the axle housing may consist of a single piece, bridge structure, 10, comprising tubular portions 11 and an enlarged central portion 12, having lateral front and rear openings 13. The rear opening is adapted to be closed by means of a detachable cap 14, secured in position as by bolts 15. Forming a part of the enlarged central portion of the axle casing, and preferably detachable therefrom, is a gear-supporting shell 16. This shell may be secured in position and form a cover for the front opening of the housing, as by means of bolts 17. The shell 16 is provided with integral inwardly extending bearing supports 18, in which may be arranged combined radial and thrust bearings 19, these bearings being adjustably mounted and held in position by threaded clamping pieces 19'. The usual differential housing 20 is adapted to have its laterally extending tubular portions 21 arranged in the bearings 19; the bearings and their supports are adapted to be secured in proper relation by means of the detachable cap pieces 22.

The usual driven shaft comprises axle sections 23 having their respective inner ends mounted in the differential housing, each with the usual bevel gear 24 keyed thereon, as at 25. Their respective outer ends are adapted to be connected as by means of a clutch member 26 to the usual driving wheels, one of which is illustrated at 27, as mounted on combined radial and thrust bearings 28 on the tubular portion 11 of the axle. These parts are secured in position by means of a collar 29, threaded on the axle tube, and a hub cap 30 which may be suitably secured on the driving wheel as by threads.

The shell 16 of the axle housing is provided at its forward end with a lateral opening 31, over which is adapted to be fitted a cap and driving unit supporting member 32. A tubular shaft or pinion member 33 may be arranged in a pair of spaced bearings 34 and 35 adapted to carry combined radial and thrust loads. The outer race of the bearing 35 may be arranged in a sleeve 36 having a threaded connection as at 37, with a spacing member 38 between the bearings. The sleeve 36 is adapted to be adjustably mounted as by means of threads 39 in the member 32. When it is desired to adjust the shaft member 33 axially without disturbing the relative adjustment of the bearings 34 and 35, a tool may be inserted through opening 40 formed in the cap 32, and through the slots 41 in the spacing member 38; and the sleeve 36 may be screwed forwardly and rearwardly without relative adjustment between it and the spacing member 38; on the other hand, if it is desired to effect a relative adjustment between the bearings 34 and 35 without a change in the position of the pinion member 33, the spacing member 38 may be moved relative to the sleeve 36 by the same tool, without moving the sleeve in its support. Then all parts may be locked in position by the insertion of a finger 42 formed in a cover piece 43 for the opening 41. It will be noted that the tubular member 33 is provided at its rear end with bevel teeth 44, forming a forward pinion, and at its forward end with clutch teeth 45.

Arranged within the member 33 and, preferably, adapted to be spaced from and supported independently thereof, is a shaft member 46. The rear end of the member 46 is formed with teeth 47, for a rearward pinion, and at its forward end has suitably connected thereto a clutch member having teeth 48. This clutch member is secured in position by the threaded collar 49.

A driving shaft 50, having splines 51, is adapted to have its contracted rear, or lower, end 52 mounted in a rear thrust and radial bearing 53, arranged in a cup 54, suitably mounted and threaded in position as at 55, in the housing member 16. The forward end of this shaft may also be mounted in a bearing 56 arranged in a cup 57 secured, as by threaded adjusting means 58, in the forward end of the cap member 32.

It will be noted that the lower end of the rear pinion 47 is supported on the shaft 50 by means of an anti-friction roller bearing 59, and at its forward end on the same shaft through a similar bearing 60. It will also be noted that ball thrust bearings 61 and 62 are arranged between the lower and upper ends of the pinion member 46, the bearing 53, and the shoulder 63 of the shaft 50, respectively.

A clutch member 64 having internal teeth 65 is slidably arranged on the splines 51 of the driving shaft 50 so that its internal clutch teeth 66 formed at its rear end may be selectively brought into engagement with either the teeth 45 driving the forward pinion 44, or with the teeth 48 for driving the rearward pinion 47. These sliding movements are imparted by means of an integral collar 67, formed on the clutch member 64, and a yoke 68 in which is threaded a shifting rod 69. If it is desired to maintain this clutch member either in one engaged position or the other, the yoke 68 may be provided with a wedge portion 70, against which a spring-pressed plunger 71 may rest.

When the various parts of the driving unit are arranged in position in the cap member 32 the latter is secured in position on the housing member 16 as by bolts 72. In this position the rear driving pinion 47 is in mesh with a driven gear 73 nested within another driven gear 74, both of which are suitably secured as by bolts 75 or rivets 76 to the differential housing. The driven gear 74, it will be noted, is also adapted to mesh with the forward driving pinion 44; so that it will be seen the forward driving pinion 44 and its meshing driven gear 74 form a low direct drive gear set, and the rearward driving pinion 47 and its meshing driven gear 73 form a high direct drive gear set between the driving shaft 50 and the driven shaft 23, through the differential gearing and housing 24 and 20, respectively.

Although the high direct drive gear set is nested within the low direct drive gear set, it will be seen that means are provided for disengaging these gear sets without disturbing the mounting of the driven gears or at least one of the driving pinions in the respective bearings.

If the inner or rearward pinion were entirely supported in the cap member 32, which might be done very easily, the driving pinions and gears could be disengaged without disturbing any of their bearing mountings or adjustments. Referring more particularly to Fig. 2, it will be seen that the driving pinions 44 and 47 may be disengaged from their respective driven gears by merely removing the bolts 72 which fasten the cap member 32 to the housing member 16. When this is done, the contracted end portion 52 of the driving shaft 50, which has a sliding fit in its rear supporting bearing 53, is entirely slipped out so that it is clear of this bearing. When this has been done, both of the pinions are entirely disengaged from their respective driven gears, and the rear pinion 47 will be found arranged between the inner diameter of the outer driven gear 74 and the outer diameter of the inner driven gear 73. When the parts are in this position, the cap member 32 with the parts supported therein may be moved laterally slightly and then moved forwardly, removing and entirely disassembling the driving unit from the driven unit without further disturbing the mountings.

While I have described and will specifically claim what I deem to be a preferred form of my invention, it will be obvious that various other modifications and changes may be made without departing from the spirit and scope hereof.

Having thus described my invention, what I claim and desire to secure by Letters Patent is:

1. The combination with an axle casing comprising a housing portion having a lateral opening formed therein, a driven shaft mounted in said portion, a pair of driven bevel gears for said shaft, a cap member adapted to fit over said opening, forward and rearward pinions mounted in said member, each pinion being adapted to mesh with one of said gears, the rear pinion having an outer diameter greater than the inner diameter of the forward pinion, the arrangement of the pinions, their supporting means, and the gears being such that the pinions may be disengaged from said driven gears without disturbing the mounting of the latter in said housing.

2. The combination with an axle casing comprising a housing portion having a lateral opening formed therein, a driven shaft mounted in said portion, a pair of bevel gears for said shaft, a cap member for closing said opening and adapted to be detachably secured to said housing, forward and rearward pinions mounted in said member, each pinion being adapted to mesh with one of said gears, the rear pinion having an outer diameter greater than the inner diameter of the forward pinion, said cap member and the pinions being adapted to be removed from said housing portion without disturbing the mounting of one of the pinions or the gears.

3. The combination with an axle casing comprising a housing portion having a lateral opening formed therein, a driven shaft mounted in said portion, a pair of driven bevel gears for said shaft mounted in anti-friction bearings in said housing portion, a cap member adapted to fit over said opening, forward and rearward pinions mounted in anti-friction bearings in said member, each pinion being adapted to mesh with one of said gears, the rear pinion having an outer diameter greater than the inner diameter of the forward pinion, said cap member and the pinions supported therein being adapted to be detached from said housing portion without disturbing the mounting of one of said pinions or said gears.

4. The combination with an axle casing comprising an enlarged central housing portion, differential gearing adapted to be mounted therein, a pair of driven bevel gears connected with the differential gearing, a member detachably secured to said housing, a forward and a rearward pinion mounted in said member and adapted to mesh with said gears, the rearward pinion having an outer diameter greater than the inner diameter of said forward pinion, the arrangement of the pinions, their supporting means, and the gears being such that the pinions may be disengaged from said driven gears without disturbing the mounting of the latter.

5. The combination with an axle casing having a central enlarged portion provided with a lateral opening, a pair of driven bevel gears mounted in said portion, a cap member adapted to fit over said opening and to be detachably secured to said portion, rearward and forward bevel pinions mounted in said member and adapted to mesh with said gears, the rearward pinion having an outer diameter greater than the inner diameter of the forward pinion, said cap member and the pinions being adapted to be removed from said housing portion without disturbing the mounting of one of the pinions in said member or the gears in said housing portion.

6. The combination with an axle casing comprising an enlarged central portion, a pair of driven bevel gears mounted therein, a cap member adapted to be detachably secured to said portion, rearward and forward pinions adapted to mesh with said driven gears, the forward pinion having a bearing mounting in said member, and the rearward pinion being supported by a bearing in said portion, the rearward pinion having an outer diameter greater than the inner diameter of the forward pinion, said cap member and driving pinions being adapted to be removed from said portion without disturbing the mounting of said driven gears.

7. The combination with an axle casing comprising a housing portion having a lateral opening formed therein, a cap member for said opening, a pair of driven bevel gears mounted in said housing portion, a tubular forward pinion mounted in said member, a rearward pinion arranged within said other pinion, having its rearward end supported by a bearing in said portion, and having its forward end supported from said cap member, the rearward pinion having an outer diameter greater than the inner diameter of said forward pinion, said cap member and pinions being adapted to be removed from said housing portion without disturbing the mounting of said driven gears.

8. The combination with an axle casing comprising a housing portion having a lateral opening formed therein, a cap member fitting over said opening and adapted to be detachably secured to said portion, driven bevel gears mounted in said portion, a forward tubular pinion mounted in said cap member, a rearward pinion having a bearing support in said portion adjacent to its rear end, said rearward pinion having a forward bearing support from said member, said rearward pinion having an outer diameter greater than the inner diameter of said forward pinion, the cap member and the pinions being adapted to be removed from said housing portion without disturbing the mounting of said gears.

9. The combination with an axle casing comprising a housing portion having a lateral opening formed therein, a cap member fitting over said opening and adapted to be detachably secured to said portion, driven bevel gears mounted in said portion, a forward tubular pinion mounted in said cap member, a rearward pinion arranged within said tubular pinion in spaced relation thereto, a driving shaft having a forward bearing support in said member and a rearward bearing support in said housing portion, said rearward bearing support also serving as a support for said rearward pinion, said rearward pinion having an outer diameter greater than the inner diameter of said forward pinion, said cap member and the pinions being adapted to be removed from said housing portion without disturbing the mounting of said driven gears.

10. The combination with an axle casing comprising a housing portion having a lateral opening formed therein, a pair of driven bevel gears mounted in said portion, a cap member adapted to fit over said opening, a forward and a rearward driving pinion adapted to mesh with said driven gears, the forward pinion being mounted in said member, the rearward pinion, which has an outer diameter greater than the inner diameter of said forward pinion and having a forward bearing support in said member, one of said driven bevel gears being nested within the other, and both of them being so proportioned that the extreme outer diameter of the inner bevel gear is spaced from the extreme inner diameter of the outer bevel gear a distance at least equal to the length of the teeth of the rearward pinion, whereby the pinions may be disengaged from the gears without disturbing the mounting of the latter.

11. The combination with an axle casing comprising a housing portion having a lateral opening formed therein, a pair of driven bevel gears mounted in said portion, a cap member adapted to fit over said opening, a forward and a rearward driving pinion adapted to mesh with said driven gears, the forward pinion being mounted in said member, the rearward pinion, which has an outer diameter larger than the inner diameter of said forward pinion and having a forward bearing support in said member, one of said driven bevel gears being nested within the other, and both of them being so proportioned that the extreme outer diameter of the inner bevel gear is spaced from the extreme inner diameter of the outer bevel gear a distance at least equal to the length of the teeth of the rearward pinion, the rear support for the rearward pinion in its bearing being of substantially the same length as the length of said tooth.

12. The combination with an axle casing comprising a housing portion having a lateral opening formed therein, a pair of driven bevel gears mounted in said portion, a cap member adapted to fit over said opening, a forward and a rearward driving pinion adapted to mesh with said driven gears, the forward pinion being mounted in said member, the rearward pinion, which has an outer diameter greater than the inner diameter of said forward pinion and having a forward bearing support in said member, one of said driven bevel gears being nested within the other, and both of them being so proportioned that the extreme outer diameter of the inner bevel gear is spaced from the extreme inner diameter of the outer bevel gear a distance at least equal to the length of the teeth of the rearward pinion, said rearward pinion having a support in its rear bearing so arranged that it may be slipped therefrom, whereby said pinions may be disengaged from said gears by a forward movement in a plane substantially normal to the axis of the driven gears for a distance substantially equal to the length of the tooth of said rearward pinion, and the pinions may be then removed from said portion by a lateral movement thereof in the same general direction without disturbing the mounting of the gears in said housing portion.

In testimony whereof I affix my signature.

BENJ. H. ANIBAL.